United States Patent
Pearson et al.

(10) Patent No.: US 12,057,609 B2
(45) Date of Patent: Aug. 6, 2024

(54) WATER RECOVERY SYSTEM FOR FUEL CELLS

(71) Applicant: Hamilton Sundstrand Corporation, Charlotte, NC (US)

(72) Inventors: Matthew Robert Pearson, Hartford, CT (US); Sean C. Emerson, Broad Brook, CT (US); Ram Ranjan, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/472,291

(22) Filed: Sep. 10, 2021

(65) Prior Publication Data

US 2023/0077343 A1     Mar. 16, 2023

(51) Int. Cl.
*H01M 8/04119*     (2016.01)
*H01M 8/04007*     (2016.01)

(52) U.S. Cl.
CPC ... *H01M 8/04171* (2013.01); *H01M 8/04007* (2013.01); *H01M 8/04164* (2013.01)

(58) Field of Classification Search
CPC ......... H01M 8/04171; H01M 8/04007; H01M 8/04164
See application file for complete search history.

(56) References Cited

U.S. PATENT DOCUMENTS

| | | | |
|---|---|---|---|
| 6,753,105 B2 | 6/2004 | Fleck et al. | |
| 6,979,508 B2 | 12/2005 | Gurin et al. | |
| 7,401,670 B2 | 7/2008 | Horii et al. | |
| 7,718,297 B2 | 5/2010 | Wilpsbaeumer et al. | |
| 7,862,936 B2 | 1/2011 | Owejan et al. | |
| 7,871,578 B2 | 1/2011 | Schmidt | |
| 7,883,804 B2 | 2/2011 | Takei et al. | |

(Continued)

FOREIGN PATENT DOCUMENTS

CN     113363530 A     9/2021
JP     2003302072 A  *  10/2003     ............ F24F 3/1423

(Continued)

OTHER PUBLICATIONS

Kawakami et al. (JP2003302072(A) and using Machine Translation as English version) (Year: 2003).*

(Continued)

*Primary Examiner* — Milton I Cano
*Assistant Examiner* — Joshua P McClure
(74) *Attorney, Agent, or Firm* — CANTOR COLBURN LLP

(57) ABSTRACT

An exhaust moisture removal system for an electric generation system including: a sorbent wheel; an interchanger; a hydrogen evaporator including an exhaust portion; and an exhaust outflow stream passageway configured to convey an exhaust from a hydrogen fuel cell of the electric generation system through a first pass and then through a second pass, the second pass being located downstream of the first pass, wherein the first pass of the exhaust outflow stream passageway passes through the sorbent wheel, then through the interchanger, and then through the hydrogen evaporator, and wherein the second pass of the exhaust outflow stream passageway passes through the hydrogen evaporator, then through the interchanger, and then through the sorbent wheel.

18 Claims, 3 Drawing Sheets

(56) References Cited

U.S. PATENT DOCUMENTS

| | | |
|---|---|---|
| 10,995,997 B2 | 5/2021 | St. Rock et al. |
| 2003/0162067 A1 | 8/2003 | McElroy |
| 2005/0100777 A1 | 5/2005 | Gurin et al. |
| 2014/0004434 A1 | 1/2014 | Saballus et al. |
| 2020/0398992 A1 | 12/2020 | Morrison |

FOREIGN PATENT DOCUMENTS

| | | | |
|---|---|---|---|
| JP | 2004316779 A | * | 11/2004 |
| JP | 2021022535 A | * | 2/2021 |
| WO | 02056400 A2 | | 7/2002 |

OTHER PUBLICATIONS

Hosoi et al. (JP2021022535(A) and using Machine Translation as English version) (Year: 2021).*
Nuitani et al. (JP2004316779(A) and using Machine Translation as English version) (Year: 2004).*
Abstract for CN113363530 (A), Published: Sep. 7, 2021, 2 pages.
European Search Report for Application No. 22190606.8, mailed Feb. 8, 2023, 10 pages.

* cited by examiner

WATER RECOVERY SYSTEM FOR FUEL CELLS

BACKGROUND

The subject matter disclosed herein relates generally to the field of hydrogen fuel cells, and specifically to a method and an apparatus for absorbing and removing water from the exhaust of hydrogen fuel cells.

Hydrogen fuel cells operate similar to batteries and consist of an anode, a cathode, and an electrolyte interposed between the anode and the cathode. Hydrogen fuel is provided to the anode and oxygen is fed to the cathode. The hydrogen fuel cell includes a catalyst at or within the anode that is configured to separate the hydrogen molecules into protons and electrons. The electrons are fed through an electrical circuit to power an electrical load, such as, for example, an electrical motor. The protons are sent to the cathode to unite with oxygen and the electrons to produce water vapor and heat in an exhaust outflow stream from the hydrogen fuel cell. There is a great desire to separate the water from the exhaust outflow stream.

BRIEF SUMMARY

According to one embodiment, an exhaust moisture removal system for an electric generation system is provided. The exhaust moisture removal system including: a sorbent wheel; an interchanger; a hydrogen evaporator including an exhaust portion; and an exhaust outflow stream passageway configured to convey an exhaust from a hydrogen fuel cell of the electric generation system through a first pass and then through a second pass, the second pass being located downstream of the first pass, wherein the first pass of the exhaust outflow stream passageway passes through the sorbent wheel, then through the interchanger, and then through the hydrogen evaporator, and wherein the second pass of the exhaust outflow stream passageway passes through the hydrogen evaporator, then through the interchanger, and then through the sorbent wheel.

In addition to one or more of the features described above, or as an alternative, further embodiments may include that the sorbent wheel includes a sorbent configured to absorb water under a first humidity and reject the water under a second humidity that is higher than the first humidity.

In addition to one or more of the features described above, or as an alternative, further embodiments may include that the sorbent wheel is configured to rotate the sorbent between the second pass and the first pass, and wherein the sorbent is configured to absorb the water from the exhaust in the second pass within the sorbent wheel and reject the water into the exhaust in the first pass within the sorbent wheel.

In addition to one or more of the features described above, or as an alternative, further embodiments may include that the interchanger is configured to remove a selected amount heat from the exhaust in the first pass of the exhaust outflow stream passageway within the interchanger and transfer the selected amount of heat to the exhaust in the second pass of the exhaust outflow stream passageway within the interchanger.

In addition to one or more of the features described above, or as an alternative, further embodiments may include that the interchanger is fluidly connected to the sorbent wheel, the interchanger being configured to receive the exhaust from the sorbent wheel through the first pass of the exhaust outflow stream passageway.

In addition to one or more of the features described above, or as an alternative, further embodiments may include that the interchanger is fluidly connected to the exhaust portion of the hydrogen evaporator, the interchanger being configured to receive the exhaust from the exhaust portion of the hydrogen evaporator through the second pass of the exhaust outflow stream passageway.

In addition to one or more of the features described above, or as an alternative, further embodiments may include that the sorbent wheel is fluidly connected to the interchanger, the sorbent wheel being configured to receive the exhaust from the interchanger through the second pass of the exhaust outflow stream passageway.

In addition to one or more of the features described above, or as an alternative, further embodiments may include that the hydrogen evaporator further includes a fuel portion configured to transfer a hydrogen fuel from a hydrogen fuel tank to the hydrogen fuel cell, and wherein the fuel portion is thermally connected to the exhaust portion and the hydrogen evaporator is configured to transfer a selected amount of heat from the exhaust to the hydrogen fuel to increase a temperature of the hydrogen fuel.

In addition to one or more of the features described above, or as an alternative, further embodiments may include one or more condensate scuppers configured to capture liquid water formed through condensation within the exhaust outflow stream passageway and remove the liquid water from the exhaust outflow stream passageway.

In addition to one or more of the features described above, or as an alternative, further embodiments may include that the one or more condensate scuppers are located in the first pass of the exhaust outflow stream passageway within the interchanger.

In addition to one or more of the features described above, or as an alternative, further embodiments may include that the one or more condensate scuppers are located in the first pass and the second pass of the exhaust outflow stream passageway within the hydrogen evaporator.

In addition to one or more of the features described above, or as an alternative, further embodiments may include that the exhaust outflow stream passageway includes an internal passageway wall that defines an internal cavity within the exhaust outflow stream passageway through which the exhaust flows from an upstream direction to a downstream direction, and wherein each of the one or more condensate scuppers further include a scoop configured to capture the liquid water as it flows in the downstream direction.

In addition to one or more of the features described above, or as an alternative, further embodiments may include that the scoop extends away from the internal passageway wall into the internal cavity, and wherein the scoop curves or bends towards the upstream direction to form a collection area therein.

In addition to one or more of the features described above, or as an alternative, further embodiments may include that the scoop extends circumferentially around an entirety of the internal passageway wall.

In addition to one or more of the features described above, or as an alternative, further embodiments may include that the scoop further includes a scoop arm and a backstop connecting the scoop arm the internal passageway wall.

In addition to one or more of the features described above, or as an alternative, further embodiments may include that the scoop arm is oriented about parallel to the internal passageway wall.

In addition to one or more of the features described above, or as an alternative, further embodiments may include that the backstop is oriented about perpendicular to the internal passageway wall.

In addition to one or more of the features described above, or as an alternative, further embodiments may include that the exhaust outflow stream passageway further includes an outlet fluidly connected to the collection area, and wherein the liquid water is configured to flow from the collection area through the outlet and out of the exhaust outflow stream passageway.

According to another embodiment, an electric generation system is provided. The electric generation system including: a hydrogen fuel tank configured to store a hydrogen fuel; a hydrogen fuel cell configured to convert the hydrogen fuel into electricity and an exhaust; an exhaust moisture removal system including: a sorbent wheel; an interchanger; a hydrogen evaporator including an exhaust portion and a fuel portion, the fuel portion being configured to transfer the hydrogen fuel from the hydrogen fuel tank to the hydrogen fuel cell; and an exhaust outflow stream passageway configured to convey the exhaust from the hydrogen fuel cell of the electric generation system through a first pass and then through a second pass, the second pass being located downstream of the first pass, wherein the first pass of the exhaust outflow stream passageway passes through the sorbent wheel, then through the interchanger, and then through the hydrogen evaporator, and wherein the second pass of the exhaust outflow stream passageway passes through the hydrogen evaporator, then through the interchanger, and then through the sorbent wheel.

According to another embodiment, a method of removing water from an exhaust of a hydrogen fuel cell is provided. The method including: flowing the exhaust from the hydrogen fuel cell into an exhaust outflow stream passageway, the exhaust outflow stream passageway including a first pass and a second pass downstream from the first pass; flowing the exhaust from the hydrogen fuel cell within the first pass through a sorbent wheel; flowing the exhaust from the sorbent wheel within the first pass through an interchanger; flowing the exhaust from the interchanger within the first pass and the second pass through an exhaust portion of a hydrogen evaporator; removing heat from the exhaust within at least one of the first pass and the second pass within the exhaust portion; flowing the exhaust from the exhaust portion within the second pass through the interchanger; transferring a selected amount of heat from the exhaust within the first pass within the interchanger to the exhaust within the second pass within the interchanger; flowing the exhaust from the interchanger within the second pass through the sorbent wheel; removing the water from the exhaust in the second pass within the sorbent wheel using a sorbent of the sorbent wheel; and transferring the water from the exhaust in the second pass within the sorbent wheel to the exhaust in the first pass of the sorbent wheel using the sorbent of the sorbent wheel.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

The embodiments disclosed herein relate to hydrogen fuel cells and more specifically proton-exchange membrane (PEM) fuel cells. PEM fuel cells provide excellent thermodynamic efficiencies (>40%) for power generation while operating at near atmospheric pressure. They have the attractive property of producing only water vapor as a "waste" product. Advantageously, this water byproduct has a societal value and that is particularly true for commercial aircraft where potable water must otherwise be loaded separately onto the aircraft, thus increasing weight and therefore fuel consumption.

The embodiments disclosed herein seek to provide a method and an apparatus for absorbing and removing water from the exhaust of hydrogen fuel cells. The embodiments disclosed herein utilize an advanced sorbent-integrated heat ex-changer (HX) that recovers waste heat for efficiency improvement and captures >99% of the exhaust water content from zero-carbon, hydrogen based energy systems such as a PEM fuel cells.

Figure 1:
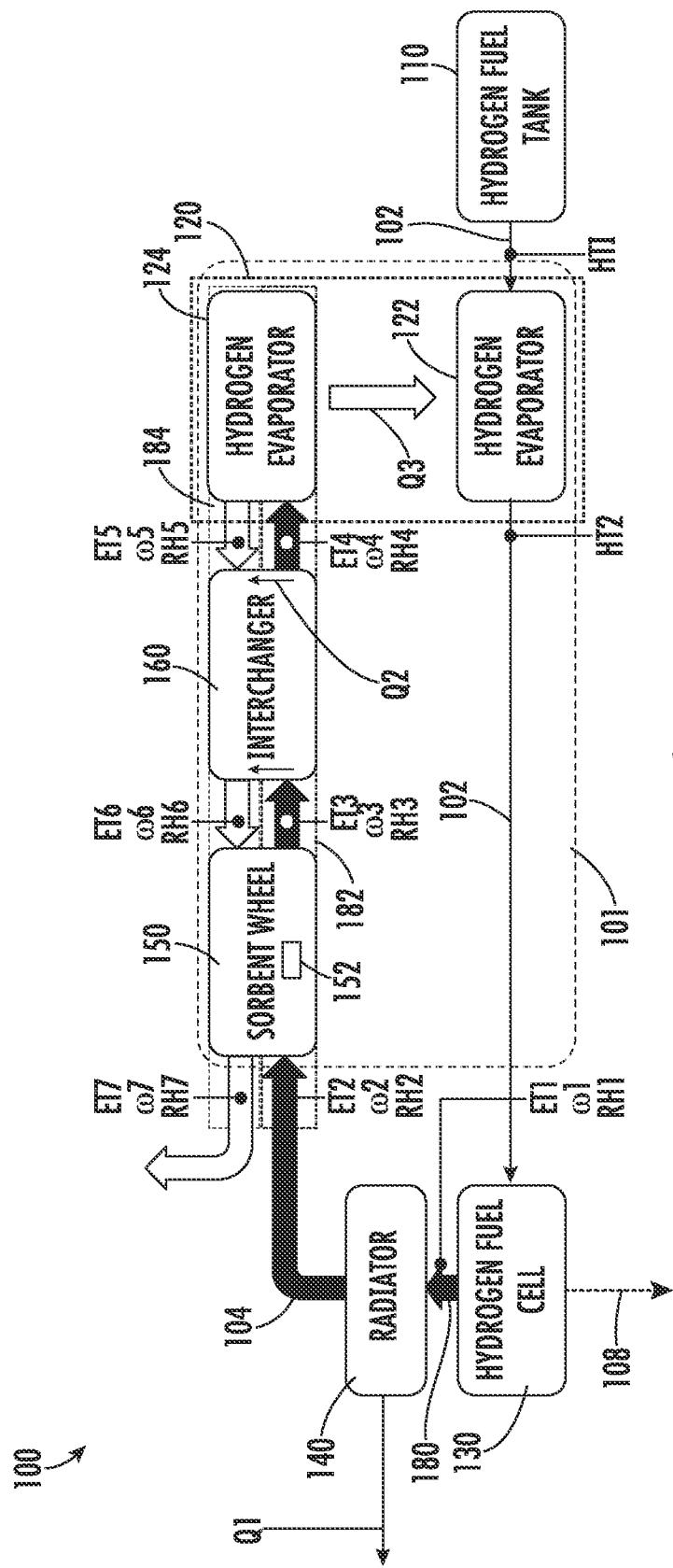
FIG. 1 illustrates a schematic view of an electrical generation system with an exhaust moisture removal system, according to an embodiment of the present disclosure.

Referring now to FIG. 1, a schematic view of an electric generation system 100 with an exhaust moisture removal system 101 is illustrated, according to an embodiment of the present disclosure. The electric generation system 100 is configured to generate electricity from hydrogen fuel 102. The hydrogen fuel 102 is stored in a hydrogen fuel tank 110. The hydrogen fuel 102 may be stored as a liquid in the hydrogen fuel tank 110. In an embodiment, the hydrogen fuel 102 may be stored within the hydrogen fuel tank 110 as a liquid at a pressure of 1 atm (14.6959 psi). The hydrogen fuel 102 may be stored at a low temperature within the hydrogen fuel tank 110 to increase storage capacity. In an embodiment, the hydrogen fuel 102 may be stored within the hydrogen fuel tank 110 at a first hydrogen temperature HT1. The first hydrogen temperature HT1 may be less than or equal to about 20.37 K (−402.07° F.).

The hydrogen fuel tank 110 is fluidly connected to and configured to deliver hydrogen fuel 102 to a fuel portion 122 of a hydrogen evaporator 120. The hydrogen evaporator 120 is configured to increase the temperature of the hydrogen fuel 102 from the first hydrogen temperature HT1 to a second hydrogen temperature HT2. The second hydrogen temperature HT2 may be greater than or equal to about 273.2 K (32.09° F.). The hydrogen evaporator 120 is configured to utilize a selected amount of heat Q3 from the exhaust 104 to heat up the hydrogen fuel 102. The hydrogen fuel 102 is in a vapor state after being heated up by the hydrogen evaporator 120.

The hydrogen evaporator 120 includes a fuel portion 122 and an exhaust portion 124. The fuel portion 122 is configured to transfer hydrogen fuel 102 from a hydrogen fuel tank 110 to a hydrogen fuel cell 130. The hydrogen fuel 102 is configured to travel through the fuel portion 122 of the hydrogen evaporator 120, while exhaust 104 from a hydrogen fuel cell 130 is configured to travel through the exhaust portion 124. The fuel portion 122 is thermally connected to the exhaust portion 124 and the hydrogen evaporator 120 is configured to transfer a selected amount of heat Q3 from the exhaust 104 to the hydrogen fuel 102 to increase the temperature of the hydrogen fuel 102. The fuel portion 122 is fluidly separate from the exhaust portion 124 to prevent the mixing of the hydrogen fuel 102 and the exhaust 124. The hydrogen evaporator 120 may be configured to transfer between about 10 kW-500 kW from the exhaust 104 to the hydrogen fuel 102.

The hydrogen evaporator 120 is fluidly connected to and configured to deliver hydrogen fuel 102 to a hydrogen fuel cell 130. The hydrogen fuel cell 130 is configured to convert the hydrogen fuel 102 into electricity 108 and exhaust 104. In an embodiment, the hydrogen fuel cell 130 is a PEM fuel cell. The hydrogen fuel 102 is delivered to the fuel cell 130 at the second hydrogen temperature HT2, a mass flow rate of 1.61 g/s ($3.55 \times 10^{-3}$ lb/s) for a fuel cell power level of 100 kWe, and in a vapor state. This is for a 100 kW electric output from a fuel cell at about 52% efficiency. It should be noted that that the mass rate scales linearly with the size of the fuel cell and that the mass flow rate number described herein are illustrative in nature. Therefore, the embodiments described herein are applicable to systems with other mass flows rates.

The hydrogen fuel cell 130 is configured to utilize the hydrogen fuel 102 to generate electricity 108. As previous discussed, the hydrogen fuel cell 130 may operate similar to batteries and consist of an anode, a cathode, and an electrolyte interposed between the anode and the cathode. The components of the hydrogen fuel cell 130 are not illustrated for ease of illustration. The hydrogen fuel 102 is provided to the anode and oxygen is fed to the cathode. The hydrogen fuel cell 130 includes a catalyst at or within the anode that is configured to separate the hydrogen molecules in the hydrogen fuel 130 into protons and electrons. The electrons are fed through an electrical circuit as electricity 108 to power an electrical load, such as, for example, an electrical motor. The electrical circuit may also be connected to an energy storage device to store the electricity generated. The protons are sent to the cathode to unite with oxygen and the electrons to produce water vapor and heat in an exhaust 104 expelled into an outflow stream passageway 180 from the hydrogen fuel cell 130.

The exhaust 104 leaving the hydrogen fuel cell 130 has a first exhaust temperature ET1, a first mass fraction of water ω1, and a first relative humidity RH1. The first exhaust temperature ET1 may be about equal to 363.2K (194.09° F.). The first mass fraction of water ω1 may be about 21% and the first relative humidity RH1 may be about 37%.

The exhaust outflow stream passageway 180 may flow through a radiator 140, a sorbent wheel 150, an interchanger 160, and the exhaust portion 124 of the hydrogen evaporator 120.

The radiator 140 is fluidly connected to the hydrogen fuel cell 130. The radiator 140 is configured to receive the exhaust 104 from the hydrogen fuel cell 130 through the exhaust outflow stream passageway 180. The exhaust 104 contains heat and water. The water may be in the form of water vapor. The radiator 140 is configured to reduce a temperature of the exhaust 104 from the first exhaust temperature ET1 to a second exhaust temperature ET2 by removing a selected amount of heat Q1 from the exhaust 104. This heat Q1 may also be used to evaporate the liquid hydrogen from fuel tank in hydrogen evaporator 122 or can be rejected overboard. The second exhaust temperature ET2 may be about equal to 313.4K (104.45° F.). Upon exiting the radiator 140 the exhaust 104 may have a second mass fraction of water ω2 and a second relative humidity RH2. The second mass fraction of water ω2 may be about 5% and the second relative humidity RH2 may be about 100%.

The exhaust outflow stream passageway 180 is configured to convey an exhaust 104 from a hydrogen fuel cell 130 of the electric generation system 100 through a first pass 182 and then through a second pass 184 located downstream of the first pass 182.

The exhaust outflow stream passageway 180 makes a first pass 182 through the sorbent wheel 150, the interchanger 160, and the exhaust portion 124 of the hydrogen evaporator 120, and then exhaust outflow stream passageway 180 makes a second pass 184 through the exhaust portion 124 of the hydrogen evaporator 120, the interchanger 160, and the sorbent wheel 150, as illustrated in FIG. 1. It is understood that the embodiments disclosed herein may be applicable to systems having more than two passes.

The first pass 182 of the exhaust outflow stream passageway 180 passes through the sorbent wheel 150, then through the interchanger 160, and then through the hydrogen evaporator 120. The second pass 184 of the exhaust outflow stream passageway 180 passes through the hydrogen evaporator 120, then through the interchanger 160, and then through the sorbent wheel 150.

The sorbent wheel 150 is fluidly connected to the radiator 140. The sorbent wheel 150 is configured to receive the exhaust 104 from the radiator 140 through the first pass 182 of the exhaust outflow stream passageway 180. The sorbent wheel 150 configured to remove some water vapor from the exhaust 104. The sorbent wheel 150 includes a plurality of sorbent 152. The sorbent 152 is configured to absorb moisture (i.e., water) under low humidity (e.g., <50% relative humidity) and reject moisture (i.e., water) under high humidity (e.g., >90% relative humidity). In other words, the sorbent 152 is configured to absorb moisture (i.e., water) under a first humidity and reject moisture (i.e., water) under a second humidity that is higher than the first humidity. In an embodiment, the sorbent may be PNS-1 Sorbent. The sorbent wheel 150 is configured to rotate the sorbent 152 between the second pass 184 and the first pass 182. The sorbent 152 is configured to absorb moisture (i.e., water) from the second pass 184 where the relative humidity is lower and reject moisture (i.e., water) into the first pass 182 where the relative humidity is higher. The sorbent 152 is configured to absorb water from the exhaust 104 in the second pass 184 within the sorbent wheel 150 and reject the water into the exhaust 104 in the first pass 182 within the sorbent wheel 150.

Upon exiting the sorbent wheel 150 in the first pass 182, the exhaust 104 may have a third exhaust temperature ET3, a third mass fraction of water ω3, and a third relative humidity RH3. The third exhaust temperature ET3 may be about 313.4K (104.45° F.), the third mass fraction of water ω3 may be about 5% or less, and the third relative humidity RH3 may be about 100%.

The interchanger 160 is fluidly connected to the sorbent wheel 150. The interchanger 160 is configured to receive the exhaust 104 from the sorbent wheel 150 through the first pass 182 of the exhaust outflow stream passageway 180. The interchanger 160 is configured to remove a selected amount of heat Q2 from the exhaust 104 in the first pass 182 of the exhaust outflow stream passageway 180 within the interchanger 160 and transfer the selected amount of heat Q2 to the exhaust 104 in the second pass 184 of the exhaust outflow stream passageway 180 within the interchanger 160. In an embodiment, the selected amount of heat Q2 transferred from the exhaust 104 in the first pass 182 of the exhaust outflow stream passageway 180 within the interchanger 160 to the exhaust 104 in the second pass 184 of the exhaust outflow stream passageway 180 within the interchanger 160 may be about 838 W per 100 kWe of fuel cell electric power output.

Upon exiting the interchanger 160 in the first pass 182, the exhaust 104 may have a fourth exhaust temperature ET4, a fourth mass fraction of water $\omega 4$, and a fourth relative humidity RH4. The fourth exhaust temperature ET4 may be about 312.0K (101.93° F.), the fourth mass fraction of water $\omega 4$ may be about 4.6%, and the fourth relative humidity RH4 may be about 100%.

The interchanger 160 is configured to decrease the temperature of exhaust 104 in the first pass 182 from the third exhaust temperature ET3 to the fourth exhaust temperature EF4. The fourth exhaust temperature EF4 being less than the third exhaust temperature ET3. The interchanger 160 is configured to reduce the mass fraction of water of exhaust 104 in the second pass 184 from the third mass fraction of water $\omega 3$ to the fourth mass fraction of water $\omega 4$. The fourth mass fraction of water $\omega 4$ being less than the third mass fraction of water $\omega 3$.

The exhaust portion 124 of the hydrogen evaporator 120 is fluidly connected to the interchanger 160. The exhaust portion 124 of the hydrogen evaporator 120 is configured to receive the exhaust 104 from the interchanger 160 through the first pass 182 of the exhaust outflow stream passageway 180. The exhaust portion 124 of the hydrogen evaporator 120 transfers the exhaust 104 from the first pass 182 to the second pass 184. The exhaust portion 124 of the hydrogen evaporator 120 is configured to remove a selected amount of heat Q3 from the exhaust 104 in the first pass 182 and/or the second pass 184, and then transfer the selected amount of heat Q3 to the fuel within the fuel portion 122.

Upon exiting the hydrogen evaporator 120 in the second pass 184, the exhaust 104 may have a fifth exhaust temperature ET5, a fifth mass fraction of water $\omega 5$, and a fifth relative humidity RH5. The fifth exhaust temperature ET5 may be about 293.2K (68.09° F.), the fifth mass fraction of water $\omega 5$ may be about 1.5%, and the fifth relative humidity RH5 may be about 100%.

The hydrogen evaporator 120 is configured to decrease the temperature of exhaust 104 from the first pass 182 to the second pass 184 from the fourth exhaust temperature ET4 to the fifth exhaust temperature ET5. The fifth exhaust temperature ET5 being less than the fourth exhaust temperature ET4. The hydrogen evaporator 120 is configured to reduce the mass fraction of water of exhaust 104 from the first pass 182 to the second pass 184 from the fourth mass fraction of water $\omega 4$ to the fifth mass fraction of water $\omega 5$. The fifth mass fraction of water $\omega 5$ being less than the fourth mass fraction of water $\omega 4$.

The interchanger 160 is fluidly connected to the exhaust portion 124 of the hydrogen evaporator 120. The interchanger 160 is configured to receive the exhaust 104 from the exhaust portion 124 of the hydrogen evaporator 120 through the second pass 184 of the exhaust outflow stream passageway 180. As previously discussed, the exhaust 104 in the second pass 184 of the exhaust outflow stream passageway 180 within the interchanger 160 receives the selected amount of heat Q2 from the exhaust 104 in the first pass 182 of the exhaust outflow stream passageway 180 within the interchanger 160.

Upon exiting the interchanger 160 in the second pass 184, the exhaust 104 may have a sixth exhaust temperature ET6, a sixth mass fraction of water $\omega 6$, and a sixth relative humidity RH6. The sixth exhaust temperature ET6 may be about 304.8K (88.97° F.), the sixth mass fraction of water $\omega 6$ may be about 1.5%, and the sixth relative humidity RH6 may be about 50%.

The interchanger 160 is configured to increase the temperature of exhaust 104 in the second pass 184 from the sixth exhaust temperature ET6 to the seventh exhaust temperature ET7. The sixth exhaust temperature ET6 being less than the seventh exhaust temperature ET7. The interchanger 160 is configured to reduce the relative humidity of exhaust 104 in the second pass 184 from the fifth relative humidity RH5 to the sixth relative humidity RH6. The sixth relative humidity RH6 being less than the fifth relative humidity RH5.

The sorbent wheel 150 is fluidly connected to the interchanger 160. The sorbent wheel 150 is configured to receive the exhaust 104 from the interchanger 160 through the second pass 184 of the exhaust outflow stream passageway 180. The sorbent wheel 150 is configured to rotate sorbent 152 between the second pass 184 and the first pass 182. The sorbent 152 is configured to absorb moisture (i.e., water) from the second pass 184 where the relative humidity is lower and reject moisture (i.e., water) into the first pass 182 where the relative humidity is higher.

Upon exiting sorbent wheel 150 in the second pass 184, the exhaust 104 may have a seventh exhaust temperature ET7, a seventh mass fraction of water $\omega 7$, and a seventh relative humidity RH7. The seventh exhaust temperature ET7 may be about 304.8K (88.97° F.), the seventh mass fraction of water $\omega 7$ may be less than or equal to about 0.2%, and the seventh relative humidity RH7 may be less than or equal to about 5%. The exhaust 104 may exit the sorbent wheel 150 having a mass flow rate of 69.7 g/s (0.15 lb/s) per 100 kWe of fuel cell electric power output.

The sorbent wheel 150 is configured to reduce the mass fraction of water of exhaust 104 in the second pass 184 from the sixth mass fraction of water $\omega 6$ to the seventh mass fraction of water $\omega 7$ using the sorbent 152. The seventh mass fraction of water $\omega 7$ being less than the sixth mass fraction of water $\omega 6$. The sorbent wheel 150 is configured to reduce the relative humidity of exhaust 104 in the second pass 184 from the sixth relative humidity RH6 to the seventh relative humidity RH7 using the sorbent 152. The seventh relative humidity RH7 being less than the sixth relative humidity RH6.

It is understood that the temperatures, relative humidity's, mass flow rates, mass fractions of water, and heat transfer rates/amounts are illustrative in nature and the embodiments disclosed herein may be applicable to systems having different values. The temperatures, relative humidity's, mass flow rates, mass fractions of water, and heat transfer rates/amounts described herein are each per 100 kWe of fuel cell electric power output.

Figure 2:
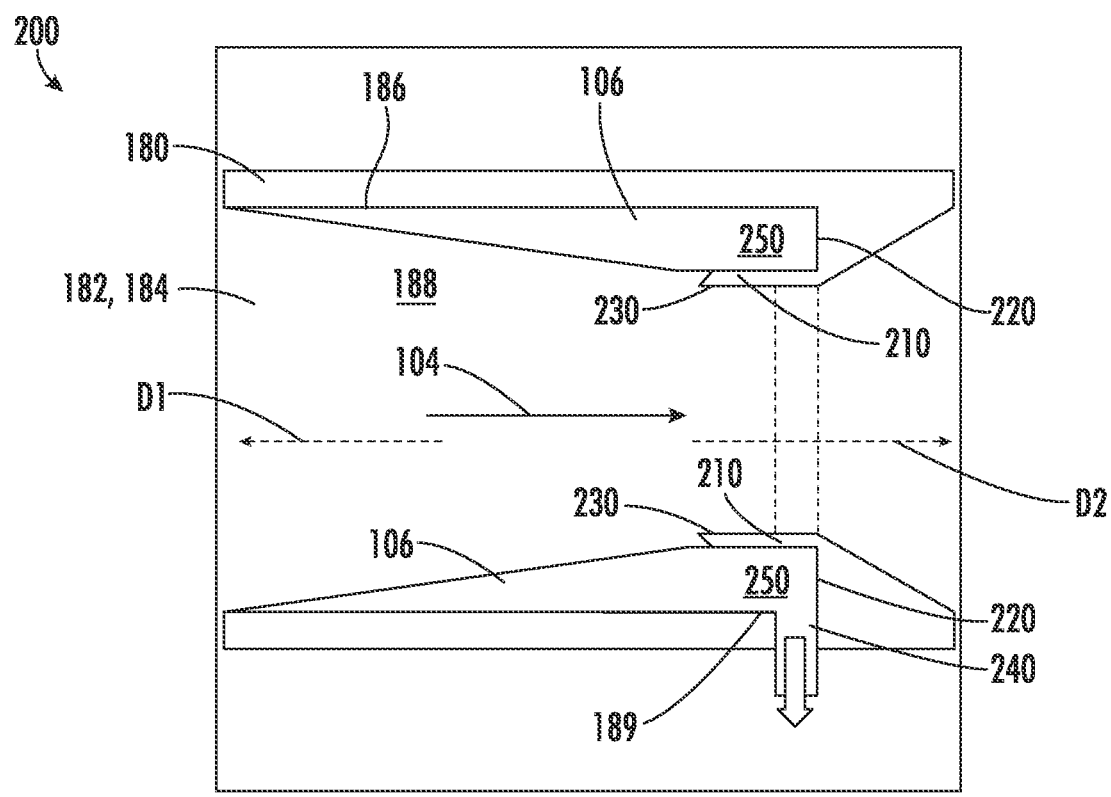
FIG. 2 illustrates a schematic view of a condensate scupper for use in the exhaust moisture removal system of FIG. 1, according to an embodiment of the present disclosure.

Referring now to FIG. 2, with continued reference to FIG. 1, a condensate scupper 200 is illustrated, in accordance with an embodiment of the disclosure. The exhaust moisture removal system 101 may include one or more condensate scuppers 200 configured to capture liquid water 106 formed through condensation within the exhaust outflow stream passageway 180 and remove the liquid water 106 from the exhaust outflow stream passageway 180.

One or more condensate scuppers 200 may be located in the first pass 182 of the exhaust outflow stream passageway 180 within the interchanger 160. Also, one or more condensate scuppers 200 may be located in the first pass 182 and the second pass 184 of the exhaust outflow stream passageway 180 within the hydrogen evaporator 120.

The exhaust outflow stream passageway 180 includes an internal passageway wall 186 that defines an internal cavity 188 within the exhaust outflow stream passageway 180 through which the exhaust 104 flows from an upstream direction D1 to a downstream direction D2. The upstream direction D1 points towards the radiator 140 and the downstream direction D2 points away from the radiator 140.

The condensate scuppers 200 includes a scoop 210 configured to capture the liquid water 106 formed through condensation within the exhaust outflow stream passageway 180. The scoop 210 is configured to capture the liquid water 106 as it flows in the downstream direction D2. The scoop 210 extends away from the internal passageway wall 186 into the internal cavity 188. The scoop 210 curves or bends towards the upstream direction D1 to form a collection area 250 therein. The scoop 210 may be curvilinear or linear shaped.

The scoop 210 is composed of a backstop 220 and a scoop arm 230. The backstop 220 connects the scoop arm 230 to the internal passageway wall 186. The backstop 220 extends away from the internal passageway wall 186 into the internal cavity 188. The backstop 220 may be oriented about perpendicular to the internal passageway wall 186. The backstop 220 may be oriented about perpendicular to the flow of exhaust 104. The scoop arm 230 is connected to the backstop 220. The scoop arm 230 may be oriented about perpendicular to the backstop 220. The scoop arm 230 may also be oriented about parallel to the internal passageway wall 186. The scoop 210 extends circumferentially around an entirety of the internal passageway wall 186. The scoop arm 230 and the backstop 220 form a collection area 250 that extends circumferentially around the entirety of the internal passageway wall 186. The condensate scupper 200 is configured to capture liquid water 106 that has formed through condensation within the collection area 250 and direct the water 106 to an outlet 240 in the internal passageway wall 186. The outlet 240 is fluidly connected to the collection area 250. The liquid water 106 is configured to flow from the collection area 250 through the outlet 240 and out of the exhaust outflow stream passageway 180.

The outlet 240 may be located in a gravitational bottom 189 of the internal passageway wall 186. Alternatively, a pump or capillary removal may be used to removed water 106 from the outlet 240. Liquid water 106 is configured to flow out of the internal cavity 188 through the outlet 240, thus drying the exhaust 104 that continues to flow in the downstream direction D2. Advantageously, the condensate scuppers 200 may be located in areas of the exhaust outflow stream passageway 180 that undergo a temperature change, which promotes formation of liquid water 106 through condensation that can be captured and removed by the condensate scupper 200.

Figure 3:
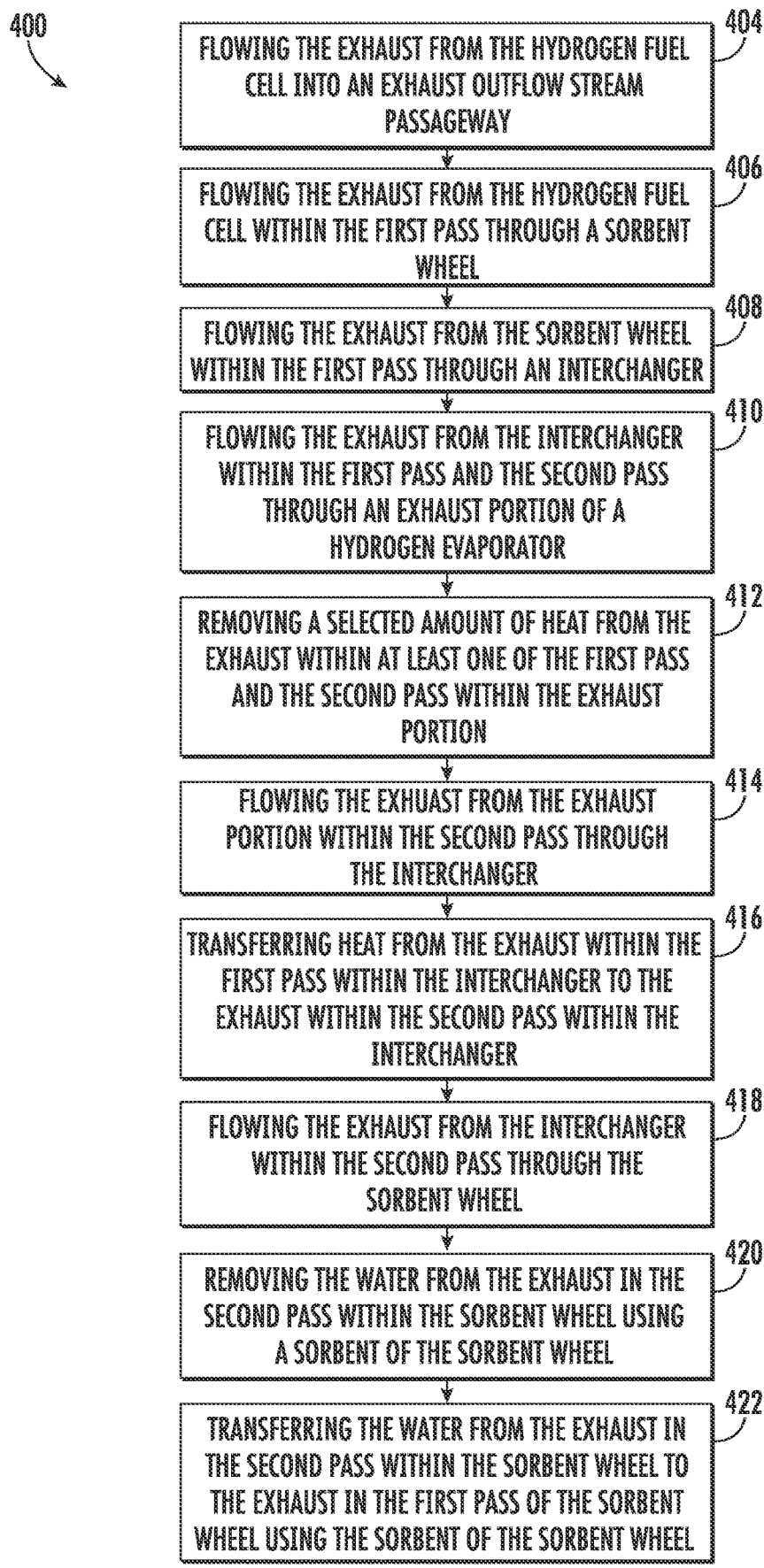
FIG. 3 illustrates a flow chart of a method of removing water from the exhaust of a hydrogen fuel cell, in accordance with an embodiment of the present disclosure.

Referring now to FIG. 3, with continued reference to FIGS. 1 and 2, a flow chart of method 400 of removing water 106 from an exhaust 104 of a hydrogen fuel cell 130 is illustrated, in accordance with an embodiment of the disclosure. The method 400 may be performed by the exhaust moisture removal system 101 of FIG. 1.

At block 404, the exhaust 104 from the hydrogen fuel cell 130 is flowed into an exhaust outflow stream passageway 180. The exhaust 104 outflow stream passageway 180 includes a first pass 182 and a second pass 184 downstream from the first pass 182.

At block 406, the exhaust 104 from the hydrogen fuel cell 130 is flowed within the first pass 182 through a sorbent wheel 150. At block 408, the exhaust 104 from the sorbent wheel 150 is flowed within the first pass 182 through an interchanger 160. At block 410, the exhaust 104 from the interchanger 160 is flowed within the first pass 182 and the second pass 184 through an exhaust portion 124 of a hydrogen evaporator 120. At block 412, a selected amount of heat Q3 is removed from the exhaust 104 within at least one of the first pass 182 and the second pass 184 within the exhaust portion 124.

At block 414, the exhaust 104 is flowed from the exhaust portion 124 within the second pass 184 through the interchanger 160. At block 416, heat Q2 is transferred from the exhaust 104 within the first pass 182 within the interchanger 160 to the exhaust 104 within the second pass 184 within the interchanger 160. At block 418, the exhaust 104 is flowed from the interchanger 160 within the second pass 184 through the sorbent wheel 150.

At block 420, the water 106 is removed from the exhaust 104 in the second pass 184 within the sorbent wheel 150 using a sorbent 152 of the sorbent wheel 150. At block 422, the water 106 is transferred from the exhaust 104 in the second pass 184 within the sorbent wheel 150 to the exhaust 104 in the first pass 182 of the sorbent wheel 150 using the sorbent 152 of the sorbent wheel 150.

While the above description has described the flow process of FIG. 3 in a particular order, it should be appreciated that unless otherwise specifically required in the attached claims that the ordering of the steps may be varied.

Technical effects and benefits of the features described herein include a removing moisture from the exhaust of a hydrogen fuel cell utilizing a sorbent configured to absorb water in low humidity environments and reject water in high humidity environments.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An exhaust moisture removal system for an electric generation system, the exhaust moisture removal system comprising:
a sorbent wheel comprising an absorbent configured to absorb water under a first humidity and reject the water under a second humidity that is higher than the first humidity;
an interchanger;
a hydrogen evaporator comprising an exhaust portion; and
an exhaust outflow stream passageway configured to convey an exhaust from a hydrogen fuel cell of the electric generation system through a first pass and then through a second pass, the second pass being located downstream of the first pass,
wherein the first pass of the exhaust outflow stream passageway passes through the sorbent wheel, then through the interchanger, and then through the hydrogen evaporator, and wherein the second pass of the exhaust outflow stream passageway passes through the hydrogen evaporator, then through the interchanger, and then through the sorbent wheel.

2. The exhaust moisture removal system of claim 1, wherein the sorbent wheel is configured to rotate the absorbent between the second pass and the first pass, and
wherein the absorbent is configured to absorb the water from the exhaust in the second pass within the sorbent wheel and reject the water into the exhaust in the first pass within the sorbent wheel.

3. The exhaust moisture removal system of claim 1, wherein the interchanger is configured to remove a selected amount of heat from the exhaust in the first pass of the exhaust outflow stream passageway within the interchanger and transfer the selected amount of heat to the exhaust in the second pass of the exhaust outflow stream passageway within the interchanger.

4. The exhaust moisture removal system of claim 1, wherein the interchanger is fluidly connected to the sorbent wheel, the interchanger being configured to receive the exhaust from the sorbent wheel through the first pass of the exhaust outflow stream passageway.

5. The exhaust moisture removal system of claim 1, wherein the interchanger is fluidly connected to the exhaust portion of the hydrogen evaporator, the interchanger being configured to receive the exhaust from the exhaust portion of the hydrogen evaporator through the second pass of the exhaust outflow stream passageway.

6. The exhaust moisture removal system of claim 1, wherein the sorbent wheel is fluidly connected to the interchanger, the sorbent wheel being configured to receive the exhaust from the interchanger through the second pass of the exhaust outflow stream passageway.

7. The exhaust moisture removal system of claim 1, wherein the hydrogen evaporator further comprises a fuel portion configured to transfer a hydrogen fuel from a hydrogen fuel tank to the hydrogen fuel cell, and
wherein the fuel portion is thermally connected to the exhaust portion and the hydrogen evaporator is configured to transfer a selected amount of heat from the exhaust to the hydrogen fuel to increase a temperature of the hydrogen fuel.

8. The exhaust moisture removal system of claim 1, further comprising:
one or more condensate scuppers configured to capture liquid water formed through condensation within the exhaust outflow stream passageway and remove the liquid water from the exhaust outflow stream passageway.

9. The exhaust moisture removal system of claim 8, wherein the one or more condensate scuppers are located in the first pass of the exhaust outflow stream passageway within the interchanger.

10. The exhaust moisture removal system of claim 8, wherein the one or more condensate scuppers are located in the first pass and the second pass of the exhaust outflow stream passageway within the hydrogen evaporator.

11. The exhaust moisture removal system of claim 8, wherein the exhaust outflow stream passageway includes an internal passageway wall that defines an internal cavity within the exhaust outflow stream passageway through which the exhaust flows from an upstream direction to a downstream direction, and
wherein each of the one or more condensate scuppers further comprise a scoop configured to capture the liquid water as it flows in the downstream direction.

12. The exhaust moisture removal system of claim 11, wherein the scoop extends away from the internal passageway wall into the internal cavity, and
wherein the scoop curves or bends towards the upstream direction to form a collection area therein.

13. The exhaust moisture removal system of claim 12, wherein the scoop extends circumferentially around an entirety of the internal passageway wall.

14. The exhaust moisture removal system of claim 12, wherein the scoop further comprises a scoop arm and a backstop connecting the scoop arm and the internal passageway wall.

15. The exhaust moisture removal system of claim 14, wherein the scoop arm is oriented about parallel to the internal passageway wall.

16. The exhaust moisture removal system of claim 14, wherein the backstop is oriented about perpendicular to the internal passageway wall.

17. The exhaust moisture removal system of claim 12, wherein the exhaust outflow stream passageway further comprises an outlet fluidly connected to the collection area, and wherein the liquid water is configured to flow from the collection area through the outlet and out of the exhaust outflow stream passageway.

18. An electric generation system, comprising:
a hydrogen fuel tank configured to store a hydrogen fuel;
a hydrogen fuel cell configured to convert the hydrogen fuel into electricity and an exhaust;
an exhaust moisture removal system comprising:
a sorbent wheel comprising an absorbent configured to absorb water under a first humidity and reject the water under a second humidity that is higher than the first humidity;
an interchanger;
a hydrogen evaporator comprising an exhaust portion and a fuel portion, the fuel portion being configured to transfer the hydrogen fuel from the hydrogen fuel tank to the hydrogen fuel cell; and
an exhaust outflow stream passageway configured to convey the exhaust from the hydrogen fuel cell of the electric generation system through a first pass and then through a second pass, the second pass being located downstream of the first pass, wherein the first pass of the exhaust outflow stream passageway passes through the sorbent wheel, then through the interchanger, and then through the hydrogen evaporator, and wherein the second pass of the exhaust outflow stream passageway passes through the hydrogen evaporator, then through the interchanger, and then through the sorbent wheel.

* * * * *